United States Patent
Hamaguri et al.

[11] Patent Number: 5,835,135
[45] Date of Patent: Nov. 10, 1998

[54] DEVICE FOR MEASURING A GLOW CENTER OF A DISPLAY DEVICE

[75] Inventors: Kenji Hamaguri, Osaka; Shinji Shimizu, Sakai, both of Japan

[73] Assignee: Minolta Co., Ltd., Osaka, Japan

[21] Appl. No.: 610,233

[22] Filed: Mar. 4, 1996

[30] Foreign Application Priority Data

Mar. 8, 1995 [JP] Japan .................................. 7-048795
May 22, 1995 [JP] Japan .................................. 7-122424

[51] Int. Cl.$^6$ ........................................................ H01J 9/44
[52] U.S. Cl. ............................ 348/191; 348/189; 445/63
[58] Field of Search ................................. 348/184, 189, 348/190, 191, 811, 813, 806, 807; 445/63, 64, 4, 72; 315/10, 11, 11.5, 368.11, 368.18; H04N 17/04; H01J 9/42, 9/44

[56] References Cited

U.S. PATENT DOCUMENTS

| | | | |
|---|---|---|---|
| 5,049,791 | 9/1991 | Kawakami | 348/191 |
| 5,200,815 | 4/1993 | Tsujihara et al. | 348/807 |
| 5,345,262 | 9/1994 | Yee et al. | 348/177 |
| 5,440,340 | 8/1995 | Tsurutani et al. | 348/190 |

FOREIGN PATENT DOCUMENTS

| | | | |
|---|---|---|---|
| 61-277135 | 12/1986 | Japan | H04N 17/04 |
| 2-213022 | 8/1990 | Japan | H04N 17/04 |
| 3-078935 | 4/1991 | Japan | H01J 9/42 |

*Primary Examiner*—John K. Peng
*Assistant Examiner*—Jeffrey S. Murrell
*Attorney, Agent, or Firm*—Burns, Doane, Swecker & Mathis, LLP

[57] ABSTRACT

A measuring device for measuring a glow center of a display device is provided with: an image pickup device which includes a sensing surface defined by a plurality of photo-electric conversion elements arranged in a two-dimensional manner at a specified pitch and picks up a light image to produce image data; an optical system which transmits a light image displayed on a display device to the sensing surface of the image pickup device; an optical system controller which controls the optical system to transmit the light image to the sensing surface in such a manner that the maximum spatial frequency of the light image at the sensing surface of the image pickup device is smaller than the reciprocal of the pitch of the photoelectric conversion element arrangement; and a calculator which calculates a glow center of the light image on the display device based on image data produced by the image pickup device.

25 Claims, 9 Drawing Sheets

ARRANGEMENT OF COLOR PHOSHOR DOTS

ARRANGEMENT OF PIXELS

DEVICE FOR MEASURING A GLOW CENTER OF A DISPLAY DEVICE

BACKGROUND OF THE INVENTION

This invention relates to a glow center measuring device for a display device which picks up an image of a measurement pattern displayed on a CRT (Cathode Ray Tube) or like display device, and calculates glow centers of a luminous image in a plurality of measurement points of a display screen in accordance with an image signal representing the picked up measurement pattern image.

A known device for measuring a convergence of a CRT measures displacements of phosphor dots of respective colors on the CRT as misconvergence amounts. In order to conduct such a measurement, an image of a measurement pattern displayed on the CRT is picked up by a video camera incorporating a CCD (Charge Coupled Device), and glow centers of the red (R), green (G) and blue (B) phosphor dots are calculated based on the picked up image data.

For example, a convergence measuring device disclosed in Japanese Unexamined Patent Publication No. 2-174492 adopts a video camera including a CCD area sensor and provided with a zooming mechanism. A measurement pattern displayed on a CRT is enlarged by a magnification $\beta$ which satisfies an Equation $\beta \cdot Pp = ni \cdot Pc$ (where Pp: phosphor dot pitch, Pc: pixel pitch, n: integer), glow centers of the respective phosphor dots in measurement points on the CRT are calculated using an image obtained by picking up a light image of the measurement pattern.

In the convergence measuring device disclosed in the above publication, the light image of the measurement pattern displayed on the CRT is focused on a sensing surface of the CCD area sensor (i.e., the video camera is focused to the measurement pattern); luminous images of the respective phosphor dots are sensed by a plurality of pixels of the CCD area sensor; and the glow centers of the phosphor dots are calculated based on light reception data from a plurality of pixels. The measurement pattern is enlarged by the zooming mechanism to make the pixel pitch of the CCD sensor sufficiently smaller than the phosphor dot pitch of the CRT so that the glow centers can be calculated with an improved precision.

A convergence measurement of the CRT is frequently conducted as follows. Since the misconvergence amounts differ depending upon the shape and size of a display surface of the CRT and a position on the display surface, a plurality of measurement points are generally provided on the display surface. The misconvergence amount is measured for each measurement point.

The prior art convergence measuring device thus constructed cannot satisfactorily meet users' needs for the following reason. Since the image of the measurement pattern is picked up by focusing the video camera to the respective measurement points on the CRT, it is very difficult to simultaneously measure the glow centers and misconvergence amounts for the plurality of measurement points on the CRT.

For example, in the case that an image of a measurement pattern in which phosphor dots are arranged at a pitch of 40 $\mu$m is focused on the sensing surface of the CCD area sensor where 500 pixels are arranged at a pitch of 10 $\mu$m in a horizontal direction, about 125 (=500×10/40) phosphor dots can be sensed in the horizontal direction. If the phosphor dots are arranged at a pitch of 0.3 mm on the display screen of the CRT, only an image displayed in an area of 37.5 (=125×0.3) mm on the display screen of the CRT can be sensed. Thus, if there are provided, e.g., 25 measurement points (5 points (in the horizontal direction)×5 points (in the vertical direction)) on the display screen of the CRT, the image of the measurement pattern including a plurality of measurement points cannot be focused on the sensing surface of the CCD area sensor. Convergences in a plurality of measurement points need to be measured by successively moving the video camera to these measurement points or need to be simultaneously measured by a plurality of video cameras arranged in the respective measurement points.

A method for successively moving the video camera to the measurement points leads to a poor working efficiency, and requires a time to adjust a focusing condition and perform a processing for each measurement, thereby making it difficult to realize a rapid measurement. On the other hand, a method for arranging the video cameras in the respective measurement points leads to a complicated control for the measurements by the respective video cameras and to a more large and expensive device. Though a measurement accuracy may be remarkably improved, this method is unrealistic.

SUMMARY OF THE INVENTION

It is an object of the present invention to provide a glow center measuring device for a display device which has overcome the problems residing in the prior art.

It is another object of the present invention to provide a glow center measuring device for a display device which can simultaneously measure glow centers in a plurality of measurement points without reducing the measurement accuracy.

According to the present invention, a measuring device for measuring a glow center of a display device, the measuring device comprises: an image pickup device which includes a sensing surface defined by a plurality of photoelectric conversion elements arranged in a two-dimensional manner at a specified pitch and picks up a light image to produce image data; an optical system which transmits a light image displayed on a display device to the sensing surface of the image pickup device; an optical system controller which controls the optical system to transmit the light image to the sensing surface in such a manner that the maximum spatial frequency of the light image at the sensing surface of the image pickup device is smaller than the reciprocal of the pitch of the photoelectric conversion element arrangement, and a calculator which calculates a glow center of the light image on the display device based on image data produced by the image pickup device.

With thus constructed measuring device, there is provided the optical system controller which controls the optical system to transmit the light image to the sensing surface in such a manner that the maximum spatial frequency of the light image at the sensing surface of the image pickup device is smaller than the reciprocal of the pitch of the photoelectric conversion element arrangement. A glow center of the light image on the display device is calculated based on image data of the light image transmitted by the way of the optical system which is controlled by the optical system controller. Accordingly, respective glow centers at a plurality of measurement points on the display device can be calculated simultaneously without reducing the measurement accuracy. Also, glow centers at a plurality of measurement points are measured by controlling the optical system, which will considerably reduce the measurement time. Further, the construction of the inventive measurement device is very simple, which thus needs reduced production costs.

The optical system may be preferably made to have an optic axis substantially in parallel with principle rays of the light image. This will assure a simplified glow center calculation in the calculator.

The image pickup device may be provided with a plurality of filter portions having spectral sensitivities different from one another to produce image data for a plurality of color components of the light image. The calculator may be provided with: a luminance calculating portion which calculates relative luminances of the plurality of color components by multiplying the output data of the color components by specified matrix coefficients; and a glow center calculating portion which calculates glow centers of the plurality of color components based on their respective relative luminances calculated by the luminance calculating portion. This will make it possible to simultaneously measure (glow centers of a plurality of color components, thus reducing the measurement times for a color display device.

To increase the measurement accuracy, further, the measuring device may be further provided with: a storage device which stores a point-spread function h(x) of the optical system; and a correction device which corrects a glow center calculated by the calculator based on the point-spread function h(x) stored in the storage device.

The correction device may be made to calculate a Fourier transform H(ω) of the point-spread function h(x) of the optical system and then a derivative H'(0)/H(0) of the Fourier transform, and correct a glow center calculated by the calculator using the derivative H'(0)/H(0). Also, the correction may be made to calculate $X_G = \int x \cdot h(x)dx / \int h(x)dx$ with respect to a specified area of the point-spread function h(x) of the optical system, and correct a glow center calculated by the calculator using a calculated $X_G$.

The optical system controller may be made to control the optical system to first come into an in-focus condition and then come into an out-of-focus condition corresponding to the maximum spatial frequency of the light image at the sensing surface of the image pickup device.

The optical system controller may be made to control the optical system to transmit the light image to the sensing surface in such a manner that the maximum spatial frequency of the light image at the sensing surface of the image pickup device is smaller than a half of the pitch of the photoelectric conversion element arrangement.

The point-spread function h(x) of the optical system may be made to have substantially an even function.

The derivative of the point-spread function h(x) of the optical system may be continuous. The point-spread function h(x) of the optical system may be made to have a normal continuous distribution. The point-spread function h(x) of the optical system may be made to have a distribution in the form of $(\sin X/X)^n$. Further, the optical system may be provided with a filter having a transmittance characteristic of a normal distribution.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
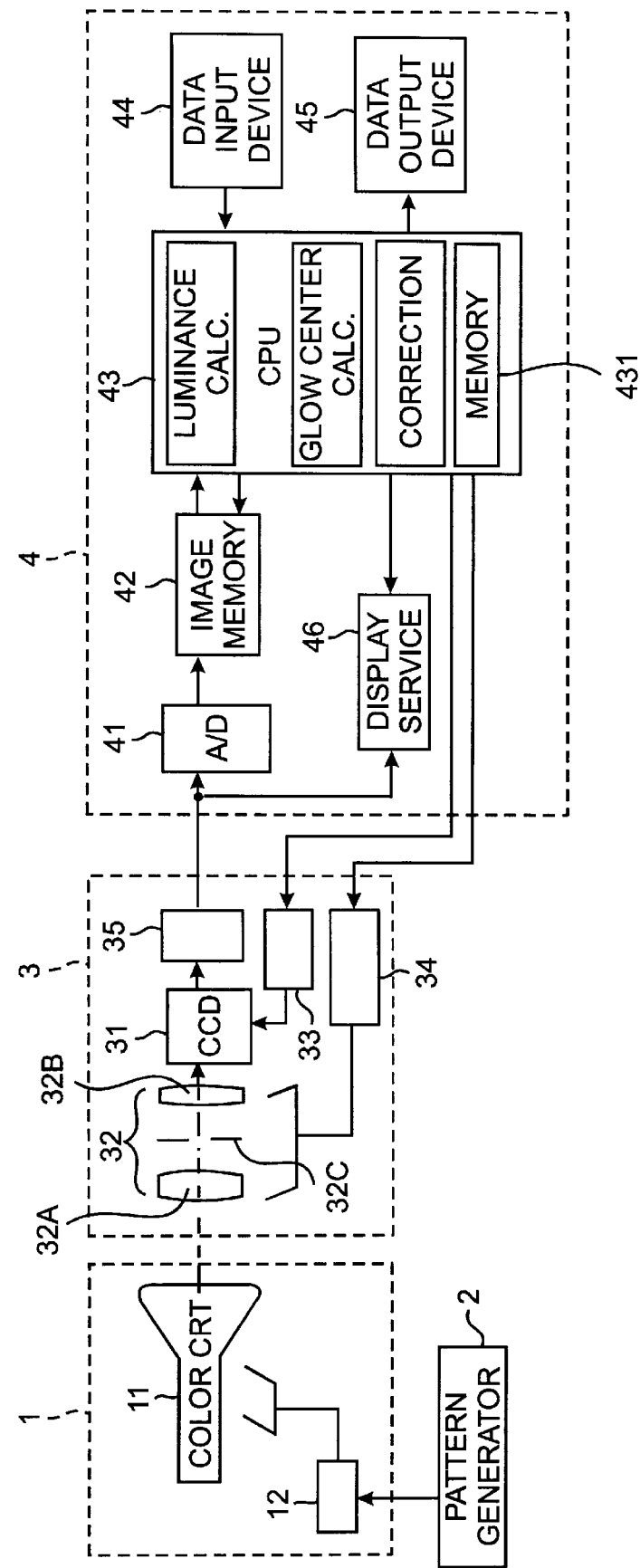
FIG. 1 is a schematic construction diagram of a convergence measuring device for a color CRT, which incorporates a glow center measuring device according to the invention.

A glow center measuring device according to the invention is described with respect to a case where it is applied to a convergence measuring device.

First, a principal method of the invention of measuring a glow center is described. In order to simplify the description, this method is described with respect to a case where a linear CCD sensor is used.

If f(x), g(x), and h(x) denote an image obtained through an ideal optical system having no aberration, an image obtained through an actual optical system, and a point-spread function, respectively, the image g(X) is expressed by Equation (1):

[Equation (1)]

$$g(x) = \int_{-\infty}^{+\infty} f(\xi) \cdot h(x - \xi) d\xi \qquad (1)$$

Further, if F(ω), G(ω) and H(ω) denote Fourier transforms of the images f(x), g(x) and the point-spread function h(x), respectively, the Equation (1) is rewritten into Equation (2):

[Equations (2),(3)]
$$G(\omega) = F(\omega) \cdot H(\omega) \qquad (2)$$
$$G'(\omega) = F'(\omega) \cdot H(\omega) + F(\omega) \cdot H'(\omega) \qquad (3)$$

wherein:

$$G(\omega) = \frac{1}{\sqrt{2\pi}} \int_{-\infty}^{+\infty} g(x) \cdot e^{-j\omega x} dx$$

$$F(\omega) = \frac{1}{\sqrt{2\pi}} \int_{-\infty}^{+\infty} f(x) \cdot e^{-j\omega x} dx$$

$$H(\omega) = \frac{1}{\sqrt{2\pi}} \int_{-\infty}^{+\infty} h(x) \cdot e^{-j\omega x} dx$$

Further, a glow center $x_G$ of the image f(x) is expressed by Equation (4).

$$x_G = \frac{\int_{-\infty}^{+\infty} x \cdot f(x) dx}{\int_{-\infty}^{+\infty} f(x) dx} \quad (4)$$

Since the Fourier transform of x·f(x) is expressed by Equation (5), if ω=0 in the Equation (5) and the Fourier transform F(ω), a numerator and denominator of the Equation (4) are expressed by Equations (6) and (7), respectively.

[Equations (5),(6),(7)]

$$\frac{1}{\sqrt{2\pi}} \int_{-\infty}^{+\infty} x \cdot f(x) \cdot e^{-j\omega x} dx = \frac{1}{\sqrt{2\pi}} \left[ -\frac{1}{j} \cdot \frac{d}{d\omega} \int_{-\infty}^{+\infty} f(x) \cdot e^{-j\omega x} dx \right] \quad (5)$$

$$= -\frac{1}{j} \cdot \frac{d}{d\omega} \left[ \frac{1}{\sqrt{2\pi}} \int_{-\infty}^{+\infty} f(x) \cdot e^{-j\omega x} dx \right]$$

$$= j \cdot \frac{d}{d\omega} F(\omega) = jF'(\omega)$$

$$jF'(O) = \frac{1}{\sqrt{2\pi}} \int_{-\infty}^{+\infty} x \cdot f(x) dx \quad (6)$$

$$\therefore \int_{-\infty}^{+\infty} x \cdot f(x) dx = \sqrt{2\pi} \cdot jF'(O)$$

$$F(O) = \frac{1}{\sqrt{2\pi}} \int_{-\infty}^{+\infty} f(x) dx \quad (7)$$

$$\therefore \int_{-\infty}^{+\infty} f(x) dx = \sqrt{2\pi} \cdot F(O)$$

Accordingly, if the Equations (6), (7) are substituted into the Equation (4), the glow center xg is expressed by Equation (8).

[Equation (8)]

$$x_G = \frac{\sqrt{2\pi}}{\sqrt{2\pi}} \frac{jF'(O)}{F(O)} = \frac{jF'(O)}{F(O)} \quad (8)$$

A glow center $x_G'$ of the image g(x) can be calculated in the same manner as the one used to calculate the glow center $x_G$ of the image f(x) and is expressed by Equation (9).

[Equation 9]

$$x_G' = \frac{jG'(O)}{G(O)} \quad (9)$$

G(0)=F(0)·H(0), G'(0)=F'(0)·H(0)+F(0)·H'(0) from the Equations (2) and (3). If these Equations are substituted into the Equation (9), the glow center $x_G'$ is expressed as follows and the glow center $x_G$ is expressed by Equation (10) using the glow center $x_G'$.

[Equation 10]

$$x_G' = \frac{j\{F'(O) \cdot H(O) + F(O) \cdot H'(O)\}}{F(O) \cdot H(O)} \quad (10)$$

$$= j \left\{ \frac{F'(O)}{F(O)} + \frac{H'(O)}{H(O)} \right\} = x_G + j\frac{H'(O)}{H(O)}$$

$$\therefore x_G = x_G' - j\frac{H'(O)}{H(O)}$$

From the Equation (10), it can be seen that the ‚low center $x_G$ of the image f(x) obtained through the ideal optical system can be obtained by correcting the glow center $x_G'$ of the image g(X) obtained through the actual optical system by –jH'(0)/H(0). Since a correction term –jH'(0)/H(0) can be calculated from the measured point-spread function h(x) of the optical system, if a data H'(0)/H(0) is stored in advance in the glow center measuring device, an accurate glow center can be obtained by correcting the measurement result of the glow center $x_G'$ by –jH'(0)/H(0).

If H'(0)=0, $x_G'$ =$x_G$. Accordingly, if the optical system is so constructed as to satisfy H'(0)=0, the measurement result of the glow center $x_G'$ can be used without being corrected. For example, if the optical system is constructed such that principle rays of a transmitted light propagate in parallel with an optic axis of the optical system (i.e. the principle rays are indent upon the sensing surface in a direction perpendicular thereto), the point-spread function h(x) of the optical system is an even function and, therefore, H'(0)=0.

Next, application of the aforementioned glow center measuring method is described with respect to a case where the image g(x) is picked up by an image pickup device including a CCD sensor. In order to simplify the description, a case where a linear CCD sensor is used is described.

If $\omega_{MAX}$ and Pc denote a maximum spatial frequency (i.e. a maximum spatial frequency of Fourier transform $G(\omega)$) of the image g(x) focused on the sensing surface of the CCD sensor and a pixel pitch of the CCD, respectively, when a relationship $\omega_{MAX} < \pi/Pc$ holds, the image g(x) is reproducible from the image data picked up by the CCD (a data including light reception data of the respective pixels), and Equation (11) holds.

[Equation (11)]

$$x_G' = \frac{jG'(O)}{G(O)} = \frac{\sum_{k=1}^{k=n} kP_c \cdot g(kP_c)}{\sum_{k=1}^{k=n} g(kP_c)} \quad (11)$$

wherein n is the total number of pixels.

If Or denotes a data of the r-th pixel of the CCD sensor (hereafter, "pixel data"), the pixel data Or is expressed by Equation (12).

[Equation (12)]

$$O_r = \int_{(r-1)P_C - \frac{\alpha}{2}}^{(r-1)P_C + \frac{\alpha}{2}} g(x) dx \quad (12)$$

wherein $\alpha$ is the size of pixel.

On the other hand, the image g(x) is expressed by Equation (13). If the Equation (13) is substituted into the Equation (12), the pixel data Or is expressed by Equation (14).

[Equations (13),(14)]

$$g(x) = a \sum_{k=1}^{k=m} g(kP_C) \cdot \frac{\sin(x - kP_C)\pi}{x - kP_C} \quad (13)$$

wherein a is coefficient.

$$O_r = a \sum_{k=1}^{k=m} g(kP_C) \cdot \int_{(r-1)P_C - \frac{\alpha}{2}}^{(r-1)P_C + \frac{\alpha}{2}} \frac{\sin(x - kP_C)\pi}{x - kP_C} dx \quad (14)$$

If a coefficient $\beta rk$ is defined as in Equation (15), the Equation (14) is rewritten into Equation (16). In accordance with the Equation (16), the respective pixel data O1, O2, ..., On can be expressed by Equation (17).

[Equations (15) to (17)]

$$\beta_{rk} = \int_{(r-1)P_C - \frac{\alpha}{2}}^{(r-1)P_C + \frac{\alpha}{2}} \frac{\sin(x - kP_C)\pi}{x - kP_C} dx \quad (15)$$

$$O_r = a \sum_{k=1}^{k=n} g(kP_C) \cdot \beta_{rk} \quad (16)$$

$$O_1 = a\{g(P_C) \cdot \beta_{11} + g(2P_C) \cdot \beta_{12} + \ldots + g(nP_C) \cdot \beta_{1n}\} \quad (17)$$
$$O_2 = a\{g(P_C) \cdot \beta_{21} + g(2P_C) \cdot \beta_{22} + \ldots + g(nP_C)\}$$
$$\vdots$$
$$O_n = a\{g(P_C) \cdot \beta_{n1} + g(2P_C) \cdot \beta_{n2} + \ldots + g(nP_C) \cdot \beta_{nn}\}$$

The Equation (17) can be expressed by a matrix as in Equation (18). If the pixel data Or (r=1, 2, ..., n), the coefficient $\beta rk=1, 2, ..., n$) and the image g (rPc) (r=1, 2, ..., n) are defined matrices as in Equations (19) to (21), the Equation 18) can be rewritten into Equation (22). If $[\beta(n, n)]^{-1}$ denotes an inverse matrix of $[\beta(n, n)]$, the Equation (22) can be rewritten into Equation (23). Accordingly, the image g(rPc) can be calculated in accordance with Equation (23).

[Equations (18) to (23)]

$$\begin{bmatrix} O_1 \\ O_2 \\ \vdots \\ O_n \end{bmatrix} = \begin{bmatrix} \beta_{11} & \beta_{12} & \ldots & \beta_{1n} \\ \beta_{21} & \beta_{22} & \ldots & \beta_{2n} \\ \vdots & \vdots & & \vdots \\ \beta_{n1} & \beta_{n2} & \ldots & \beta_{nn} \end{bmatrix} \begin{bmatrix} g(P_C) \\ g(2P_C) \\ \vdots \\ g(nP_C) \end{bmatrix} \quad (18)$$

$$[O(n)] = \begin{bmatrix} O_1 \\ O_2 \\ \vdots \\ O_n \end{bmatrix} \quad (19)$$

$$[\beta(n,n)] = \begin{bmatrix} \beta_{11} & \beta_{12} & \ldots & \beta_{1n} \\ \beta_{21} & \beta_{22} & \ldots & \beta_{2n} \\ \vdots & \vdots & & \vdots \\ \beta_{n1} & \beta_{n2} & \ldots & \beta_{nn} \end{bmatrix} \quad (20)$$

$$[g(n)] = \begin{bmatrix} g(P_C) \\ g(2P_C) \\ \vdots \\ g(nP_C) \end{bmatrix} \quad (21)$$

$$[O(n)] = [\beta(n,n)][g(n)] \quad (22)$$

$$[g(n)] = [\beta(n,n)]^{-1}[O(n)] \quad (23)$$

Thus, the glow center $x_G'$ can be calculated by substituting the image g(nPc) calculated in accordance with the Equation (23) into the Equation (11).

The image data Or can be approximated by the image g (rPc). In such a case, diagonal elements $\beta rr$ (r=1, 2, ..., n) of the coefficient matrix $[\beta(n, n)]$ are all 1 and the other elements thereof are all 0. An Equation g(n)=On (n=1, 2, ...) holds. Further, if the image data Or is approximated by integration of g(x) expanded by Taylor series in the neighborhood of x=rPc from $\{(n-1)Pc-\alpha/2\}$ to $\{(n-1)Pc+\alpha/2\}$, the image data Or is expressed by Equation (24).

[Equation (24)]

$$O_r = \sum_{i=1}^{i=n} \gamma_i g^{(i-1)}(rP_C) \quad (24)$$

In the Equation (24), $g^{(i-1)}(x)$ denotes a (i-1)th order derivative of g(x) and is expressed by Equation (25). Accordingly, the Equation (24) can be transformed into Equations (26), (27) which are similar to the Equations (22), (23).

[Equations (25) to (27)]

$$g^{(i-1)}(x) = \alpha \sum_{k=1}^{k=m} g(kP_C) \frac{d^{(i-1)}}{dx^{(i-1)}} \left( \frac{\sin(x - kP_C)\pi}{x - kP_C} \right) \quad (25)$$

$$\begin{bmatrix} O_1 \\ O_2 \\ \vdots \\ O_n \end{bmatrix} = \begin{bmatrix} \beta_{11} & \beta_{12} & \cdots & \oplus_{1n} \\ \beta_{21} & \beta_{22} & \cdots & \beta_{2n} \\ \vdots & \vdots & & \vdots \\ \beta_{n1} & \beta_{n2} & \cdots & \beta_{nn} \end{bmatrix} \begin{bmatrix} g(P_C) \\ g(2P_C) \\ \vdots \\ g(nP_C) \end{bmatrix} \quad (26)$$

$$\begin{bmatrix} g(P_C) \\ g(2P_C) \\ \vdots \\ g(nP_C) \end{bmatrix} = \begin{bmatrix} \beta_{11} & \beta_{12} & \cdots & \oplus_{1n} \\ \beta_{21} & \beta_{22} & \cdots & \beta_{2n} \\ \vdots & \vdots & & \vdots \\ \beta_{n1} & \beta_{n2} & \cdots & \beta_{nn} \end{bmatrix} \begin{bmatrix} O_1 \\ O_2 \\ \vdots \\ O_n \end{bmatrix} \quad (27)$$

Thus, in this case as well, the glow center $x_G'$ can be calculated by substituting the $(g(rPc)(r=1, 2, \ldots, n)$ calculated in accordance with the Equation (27) into the Equation (11) as in the case of the Equation (23).

As is clear from the above description, the image of the measurement pattern is focused on the sensing surface of the image pickup device such that $\omega_{MAX} < \pi/Pc$, the data [g(n)] of the image g(x) is calculated by conducting a calculation in accordance with the Equation (23) using the image data [O(n)] obtained by picking up the measurement pattern image. Based on the data [g(n)], there are calculated a Fourier transform value G(0) and a derivative G'(0) of the Fourier transform. Consequently, the glow center $x_G$ is calculated in accordance with the Equations (9) and (10).

Further, in the case that the optical system is constructed such that the principle rays of the transmitted light propagate substantially in parallel with the optic axis of the optical system, the point-spread function h(x) of this optical system is an even function. Accordingly, a derivative H'(0) of Fourier transform H($\omega$) of the point-spread function h(x) becomes 0, and the glow center $x_G$ can be directly calculated in accordance with the Equation (9) using the data [g(n)].

If $\omega_{MAX}$ is too small, the image becomes blur and an output per pixel of the CCD is reduced, with the result that a signal-to-noise (S/N) ratio gets bad. If $\omega_{MAX} \leq 2\pi/Pc$, the glow center $x_G$ can approximately be calculated in accordance with Equation (28).

[Equation (28)]

$$x_G = \frac{\sum_{k=1}^{k=n} kP_c \cdot O_k}{\sum_{k=1}^{k=n} O_k} \quad (28)$$

Fourier transform Gs($\omega$) of a signal sequence gs(x) obtained by sampling (g(x) at sampling intervals Pc is expressed by Equation (29).

[Equation (29)]

$$G_s(\omega) = \frac{\sqrt{2\pi}}{P_c} \sum_{m=-\infty}^{m=+\infty} G\left(\omega + \frac{2\pi}{P_c} m\right) \quad (29)$$

A derivative of the Equation (29) is expressed by Equation (30). Since $G(\omega)=G'(\omega)=0$ if $|\omega|>2\pi/Pc$, G(0), G'(0) can be rewritten as in Equations (31), (32) in accordance with the Equations (29), (30), respectively.

[Equations (30) to (32)]

$$G_s'(\omega) = \frac{\sqrt{2\pi}}{P_c} \sum_{m=-\infty}^{m=+\infty} G'\left(\omega + \frac{2\pi}{P_c} m\right) \quad (30)$$

$$G_s(0) = \frac{\sqrt{2\pi}}{P_c} G(0) \quad (31)$$

$$G_s'(0) = \frac{\sqrt{2\pi}}{P_c} G'(0) \quad (32)$$

Accordingly, if the Equations (31), (32) are substituted into the Equation (9), $X_G$=jG'(0)/G(0)=jGs'(0)/Gs(0).

Since Gs($\omega$) is a periodic function of a period of $2\pi/Pc$, it can be expanded to a Fourier series represented by Equation (33) and its Fourier coefficients can be expressed by Equation (34).

[Equations (33), (34)]

$$G_s(\omega) = \sum_{n=+\infty}^{n=-\infty} A_n e^{jP_c n\omega} \quad (33)$$

$$A_n = \frac{P_c}{2\pi} \int_{-\frac{\pi}{P_c}}^{+\frac{\pi}{P_c}} G_s(\omega) \cdot e^{-jP_c n\omega} d\omega \quad (34)$$

Since Gs($\omega$)=0 when $|\omega|>2\pi/Pc$, the Fourier coefficients An are expanded as below to consequently obtain Equation (35).

[Expansion and Equation (35)]

$$\begin{aligned} A_n &= \frac{P_c}{2\pi} \int_{-\frac{\pi}{P_c}}^{+\frac{\pi}{P_c}} \frac{\sqrt{2\pi}}{P_c} \cdot \left\{ G(\omega) + G\left(\omega - \frac{2\pi}{P_c}\right) + G\left(\omega + \frac{2\pi}{P_c}\right) \right\} \cdot e^{-jP_c n\omega} d\omega \\ &= \frac{1}{\sqrt{2\pi}} \left\{ \int_{-\frac{\pi}{P_c}}^{+\frac{\pi}{P_c}} G(\omega) \cdot e^{-jP_c n\omega} d\omega + \right. \\ &\quad \int_{-\frac{3\pi}{P_c}}^{-\frac{\pi}{P_c}} G(\omega) \cdot e^{-jP_c n\left(\omega + \frac{2\pi}{P_c}\right)} d\omega + \\ &\quad \left. \int_{\frac{\pi}{P_c}}^{\frac{3\pi}{P_c}} G(\omega) \cdot e^{-jP_c n\left(\omega - \frac{2\pi}{P_c}\right)} d\omega \right\} \\ &= \frac{1}{\sqrt{2\pi}} \int_{-\frac{3\pi}{P_c}}^{+\frac{3\pi}{P_c}} G(\omega) \cdot e^{-jP_c n\omega} d\omega \\ &= \frac{1}{\sqrt{2\pi}} \int_{-\frac{2\pi}{P_c}}^{+\frac{2\pi}{P_c}} G(\omega) \cdot e^{-jP_c n\omega} d\omega \\ &= g(nP_c) \end{aligned} \quad (35)$$

Similar to Gs($\omega$), Gs'($\omega$) is expressed by Equation (36), and its Fourier coefficients Bn=nPc·g(nPc).

[Equation (36)]

$$G_s'(\omega) = \sum_{n=-\infty}^{n=+\infty} B_n \cdot e^{jP_c n\omega} \quad (36)$$

Accordingly, if $\omega=0$ in the Equations (33) and (36), Gs(0), Gs'(0) are expressed by Equations (37), (38). If the Equations (37), (38) are substituted into the Equation (9), the glow center $x_G$ can be obtained in accordance with Equation (39).

[Equations (37) to (39)]

$$G_s(0) = \sum_{n=-\infty}^{n=+\infty} A_n = \sum_{n=-\infty}^{n=+\infty} g(nP_c) \quad (37)$$

$$G_s'(0) = \sum_{n=-\infty}^{n=+\infty} B_n = \sum_{n=-\infty}^{n=+\infty} nP_c \cdot g(nP_c) \quad (38)$$

$$x_G = \frac{\sum_{n=-\infty}^{n=+\infty} nP_c \cdot g(nP_c)}{\sum_{n=-\infty}^{n=+\infty} g(nP_c)} \quad (39)$$

Further, the correction value H'(0)/H(0) can be calculated based on the data concerning the point-spread function h(x) which is stored in the storage means. The glow center $x_G$ is calculated from the glow center $x_G$ calculated from the data [g(n)] in accordance with the Equation (9) and the correction value H'(0)/H(0) in accordance with the Equations (9) and (10).

Furthermore, it may be appreciated that the image data obtained by picking up the image of the measurement pattern are output after beings separated into a plurality of color components, and relative luminances of the respective color components are calculated by multiplying the output data of the color components by specified matrix coefficients. These luminances serve as pure data of the color components because they are free from data of the other color components included in the output data of the respective color components.

Glow centers for the respective color components are calculated by applying specified calculations to the luminances of these color components. Thus, in the case that the display device is a color CRT, the glow centers can be calculated for phosphor dots of the respective colors.

Next, a specific construction of the convergence measuring device will be described with the accompanying drawings. FIG. 1 is a schematic construction diagram of the convergence measuring device for a color CRT.

In FIG. 1, indicated at 1 is a color display as a measurement sample, and at 2 a pattern generator for generating, a specified measurement pattern to be described later. The color display 1 includes a color CRT 11 for display a video image and a drive controller 12 for controlling the driving of the color CRT 11. A video signal representing the measurement pattern generated by the pattern generator 2 is input to the drive controller 12. Based on the thus received video signal, the drive controller 12 generates a drive signal used to drive the color CRT 11, and sends the drive signal to the color CRT 11. The color CRT 11 directs three electron beams of R, G and B onto the rear surface of a face plate in accordance with the received drive signal, thereby causing specified phosphor dots to emit light to display the measurement pattern on a display surface.

Indicated at 3 is an image pickup device for picking, up an image of the measurement pattern displayed on the color CRT 11 of the color display 1, and at 4 a main body of the convergence measuring device for measuring a misconvergence amount in accordance with an image signal representing the measurement pattern image picked up by the image pickup device 3. The image pickup device 3 and the main body 4 constitute the convergence measuring device for the color CRT.

The convergence measuring device picks up an image of the entire measurement pattern displayed on the color CRT 11 in an out-of-focus condition by means of the image pickup device 3, and applies a specified image processing to the thus obtained image data to calculate glow centers of phosphor dots of the respective colors of R, G and B in a plurality of measurement points on the display screen of the color CRT. Based on the thus calculated low centers, misconvergence amounts in the respective measurement points are calculated.

Patterns having a variety of shapes may be used as a measurement pattern, but a crosshatch pattern obtained by crossing vertical and horizontal lines and a polka dot pattern consisting of dot images are preferred.

The image pickup device 3 includes a solid-state image sensor 31 (hereinafter, CCD 31), an optical system 32, a pickup controller 33, a optical system controller 34, and a signal processor 35. The CCD 31 includes a CCD area sensor for picking up an image. The optical system 32 focuses a light image representing the measurement pattern displayed on the color CRT on a sensing surface of the CCD 31. The pickup controller 33 controls an image pickup operation of the CCD 31. The optical system controller 34 controls a focus adjustment of the optical system 32 in accordance with a focus control signal from the device main body 4. The signal processor 35 applies a specified signal processing to the image signal output from the CCD 31 and outputs the processed image signal to the device main body 4.

Figure 2:
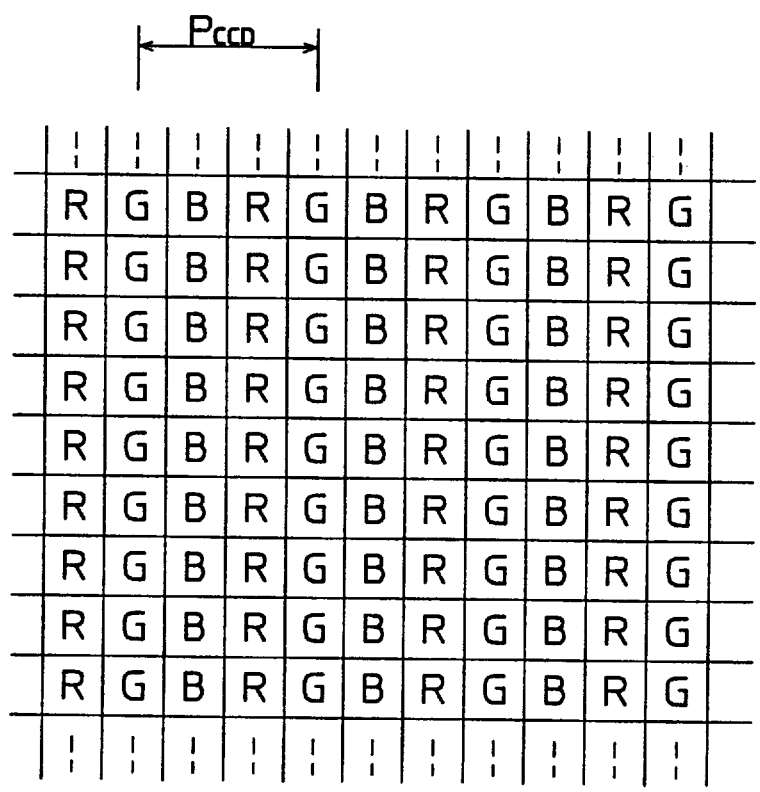
FIG. 2 is a diagram showing an arrangement of color filters of a CCD.

The CCD 31 is a single-plate color image sensor in which a plurality of photoelectric conversion elements (hereinafter, pixels) are arranged in a two-dimensional manner and color filters of R, G and B are superimposed in positions of the respective pixels as shown in FIG. 2.

Figure 3:
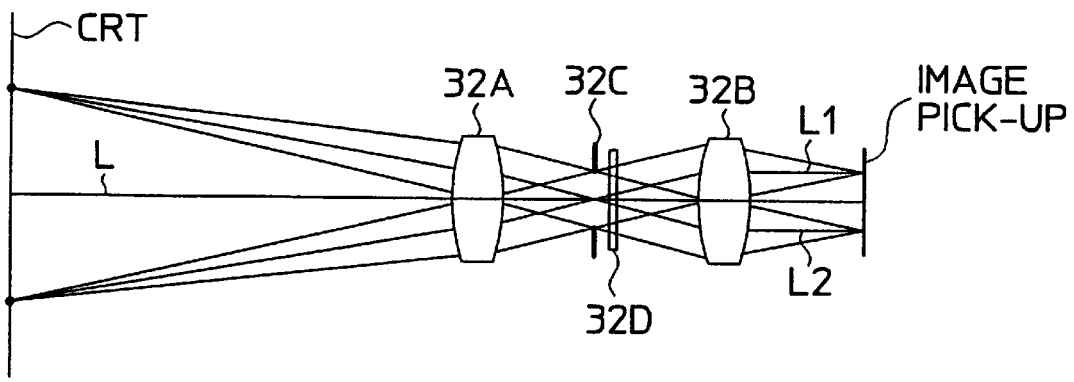
FIG. 3 is a diagram showing a construction of a first optical system in an in-focus condition.
Figure 4:
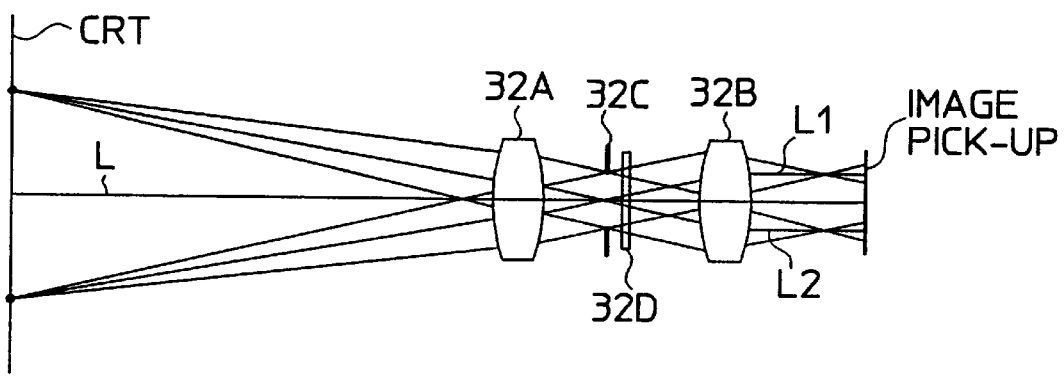
FIG. 4 is a diagram showing a construction of the first optical system in an out-of-focus condition.

The optical system 32 includes a front lens group 32A, a rear lens group 32B, and an aperture 32C as shown in FIGS. 3 and 4, and is constructed such that principle rays L1, L2 having passed through the optical system 32 (principle rays having passed through the rear lens group 32B and located on the side of a focusing surface) propagate substantially in parallel with an optic axis L. The optical system 32 is constructed as above in order to make a Fourier transform H($\omega$) of a point-spread function h(x) of the optical system 32 an even function. Accordingly, the correction term jH'(0)/H(0) of the Equation (10) becomes 0, thereby obviating the need for performing a correction. Thus, the glow center can be more accurately measured.

Figure 5:
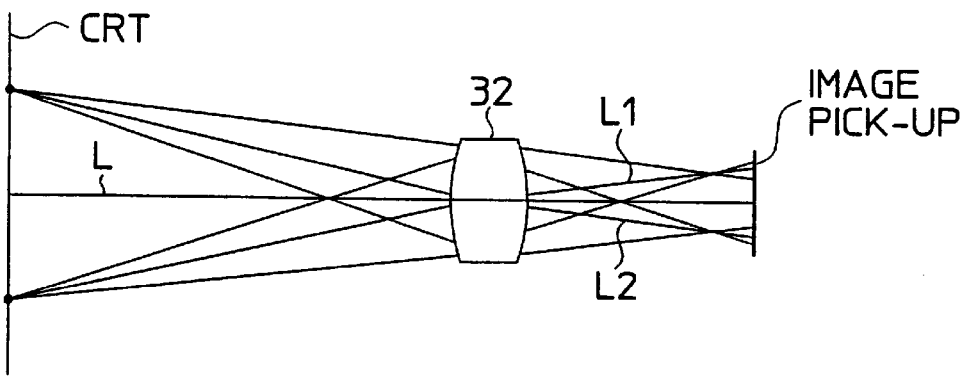
FIG. 5 is a diagram showing a construction of a second optical system in an in-focus condition.

It is also possible to adopt, as the optical system 32, an optical system in which principle rays L1, L2 on the side of the focusing surface do not propagate in parallel with the optic axis L as shown in FIG. 5. However, in such a case, it is essential to measure the point-spread function h(x) of the optical system 32 in advance and to calculate the correction value H'(0)/H(0) for each pixel position of the sensing surface of the CCD 31. This leads to disadvantages of an increased memory capacity for storing the correction values H'(0)/H(0), a prolonged calculation time due to the correction, and a reduced accuracy. Thus, it is preferable to adopt an optical system in which the principle rays L1, L2 on the focusing, surface side propagate substantially in parallel with the optic axis L.

Depending on the optical system, it may be difficult to restrict a spatial frequency band of an image only by a defocus amount. In such a case, a transmittance T of an exit pupil of the optical system may be so set as to get smaller as a distance x from the optic axis L gets longer.

Figure 6:
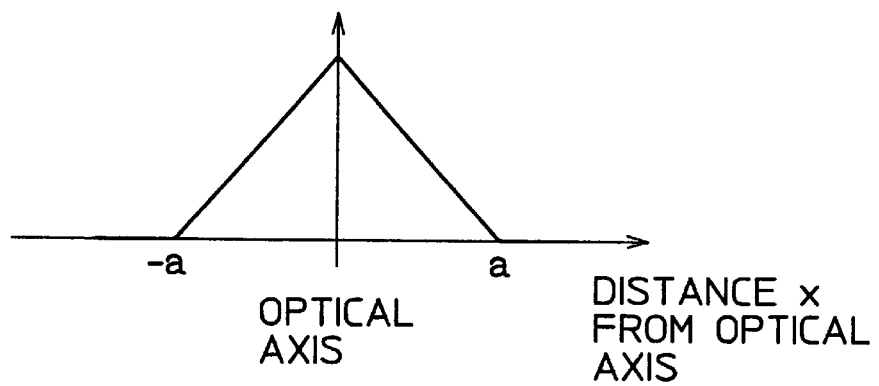
FIG. 6 is a graph showing a first transmittance characteristic for an exit pupil.
Figure 7:
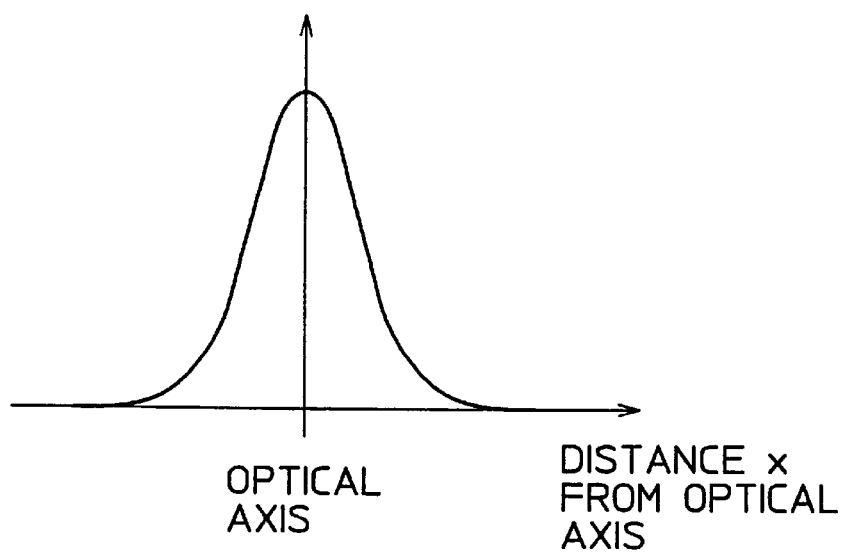
FIG. 7 is a graph showing a second transmittance characteristic for an exit pupil.
Figure 8:
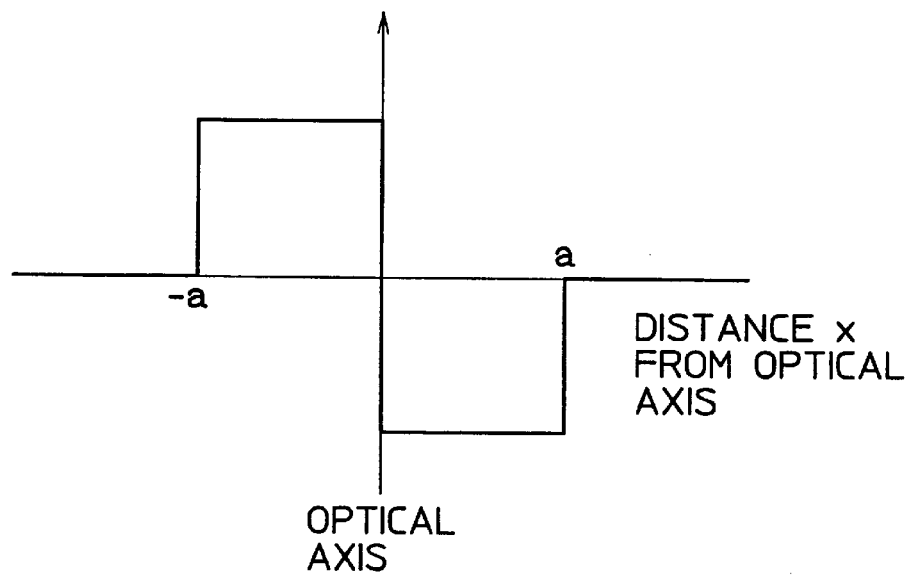
FIG. 8 is a graph showing a derivative of the first transmittance characteristic.
Figure 9:
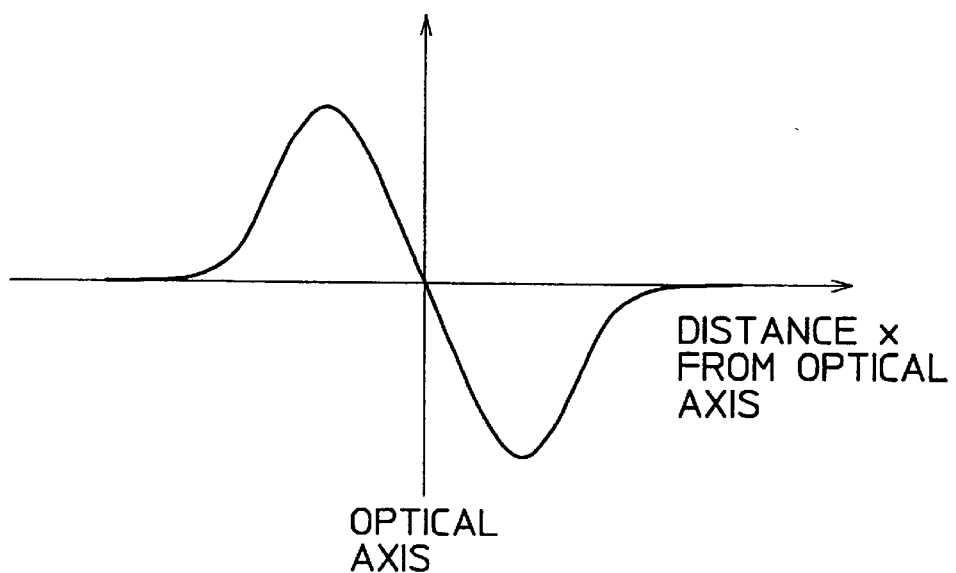
FIG. 9 is a graph showing a derivative of the second transmittance characteristic.
Figure 10:
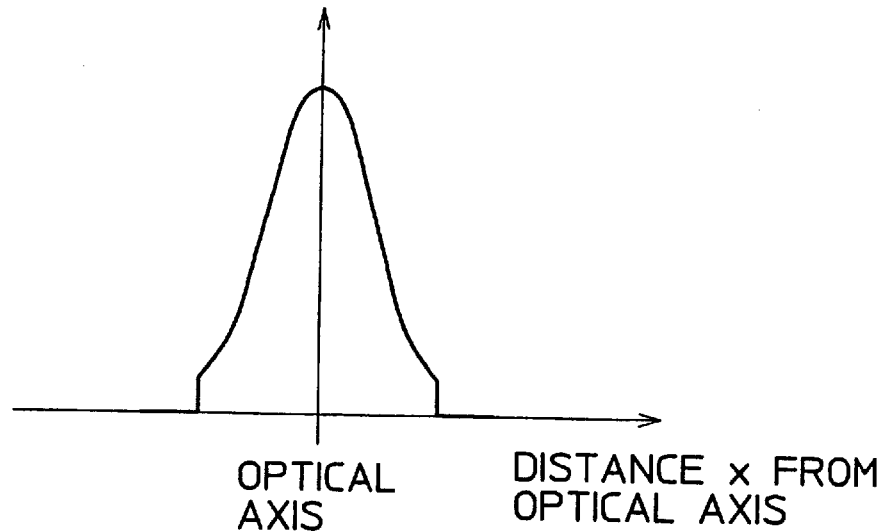
FIG. 10 is a graph showing a third transmittance characteristic for an exit pupil.

FIG. 6 is a graph showing a transmittance characteristic of the exit pupil of the optical system in the form of a triangular pulse, and FIG. 7 is a graph showing this transmittance characteristic in the form of a normalized function. FIGS. 8 and 9 are graphs showing derivatives T' (rates of change of transmittances T with respect to the distance x from the optic axis) of transmittances T shown in FIGS. 6 and 7, respectively.

In view of restricting, the spatial frequency band of the image, it is preferred that the derivative T' of the transmittance T be continuous. Accordingly, it is better to adopt a characteristic having a normal distribution whose derivative is continuous than to adopt the triangular pulse characteristic whose derivative is discontinuous at the optic axis and points ±a (see FIG. 8).

As shown in FIG. 9, the derivative T' is quite small in peripheral areas where the distance x from the optic axis is long. Accordingly, even if the derivative becomes discontinuous in the peripheral areas, it gives only a small influence on a restriction characteristic of the spatial frequency band of the image. Thus, in the case that the transmittance characteristic is normally distributed, the derivative may be continuous in any arbitrary point. However, instead of a perfectly normal distribution, the transmittance characteristic may have such a normal distribution in which the transmittance T discontinuously becomes 0 in the peripheral areas.

The other example of the transmittance characteristic having a continuous derivative may be a characteristic having a Fourier inverse transform function of $f(\theta)=(\sin\theta/\theta)^3$.

Figure 11:
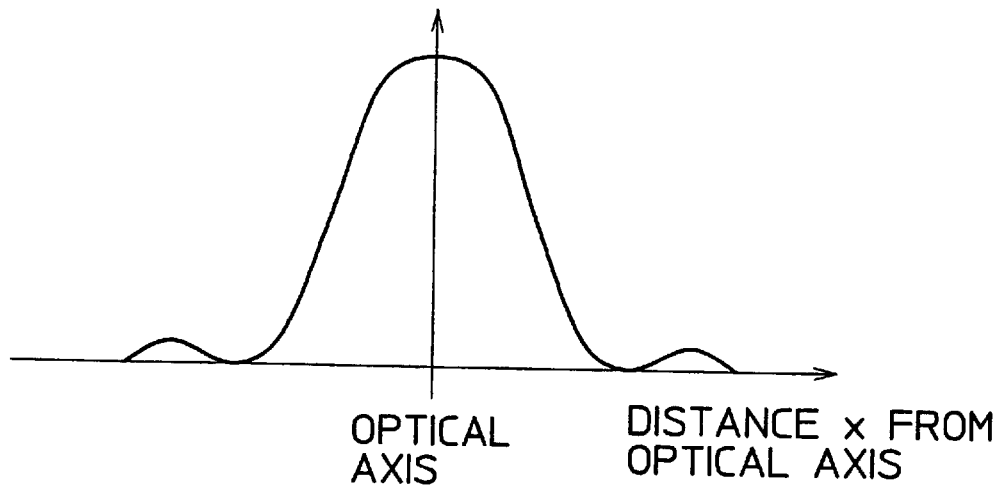
FIG. 11 is a graph showing a fourth transmittance characteristic for an exit pupil.
Figure 12:
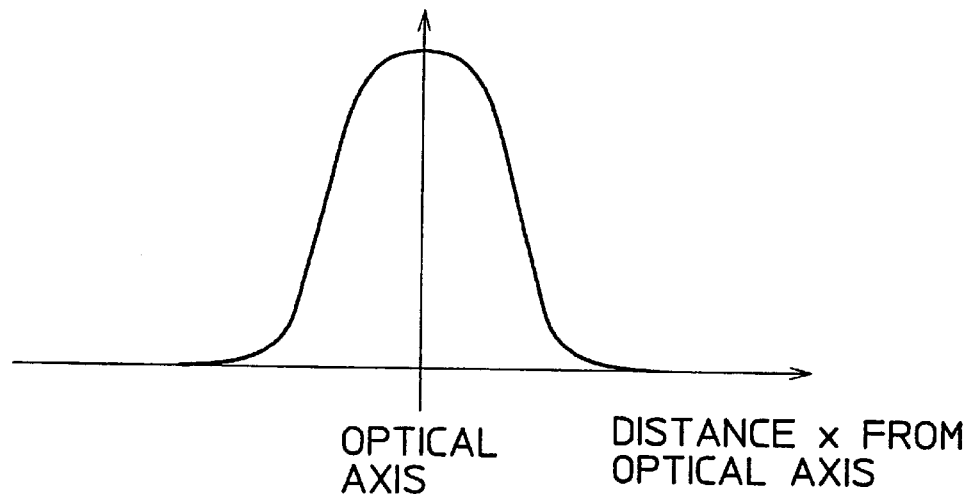
FIG. 12 is a graph showing a fifth transmittance characteristic for an exit pupil.

Further, a transmittance characteristic shown in FIG. 11 or 12 may be adopted. These transmittance characteristics can be easily obtained by exposing a photographic film or plate to a diffraction pattern of a circular opening.

Furthermore, as shown in FIGS. 3 and 4, it may be appreciated to provide a filter 32D having a transmittance characteristic of a normal distribution at the aperture 32C.

In order to enable a convergence measurement for a variety of sizes of color CRTs 11, the front or rear lens group 32A, 32B of the optical system 32 may have a variable focal length. As described later, during, the convergence measurement, the image of the measurement pattern is picked up in a specified out-of-focus condition in this embodiment. In the case that the front or rear lens group 32A or 32B of the optical system 32 has a variable focal length, moving amounts of the front or rear lens group 32A or 32B which gives specified defocus amounts may be stored in advance in a memory in correspondence with the focal lengths thereof. The moving amount of the front or rear lens group 32A or 32B is changed according to the set focal length.

The optical system controller 34 automatically focuses the optical system 32 by moving the front lens group 32A in accordance with a control signal from a controller 43.

The device main body 4 includes an analog-to-digital (A/D) converter 41 for converting the analog image signal input from the image pickup device 3 into a digital signal, an image memory 42 for storing the thus obtained digital signal (hereinafter, image data), the controller 43 for centrally controlling the convergence measuring operation, a data input device 44, a data output device 45, and a display device 46 for displaying the video image picked up by the image pickup device 3.

The A/D converter 41 A/D converts the respective color component image signals of R, G and B and outputs them to the image memory 42. The image memory 42 includes three memory areas each having a capacity of storing one frame of image. The color component image data of R, G and B output from the A/D converter 41 are stored in the respective memory areas.

The controller 43 (CPU in FIG. 1) is a central processing unit including a microcomputer. In accordance with a calculation/control program stored in an internal memory 431 the controller 43 performs a focus control of the image pickup device 3, and calculates the glow center and a misconvergence amount using the respective color component image data stored in the image memory 42. The calculation results are stored in the internal memory 431 and output to the data output device 45.

The controller 43 performs the focus control according to a so-called "climbing method." Specifically, high frequency components of the image signal representing the picked up image are extracted, and such a focus control signal is sent to the optical system controller 34 that the extracted high frequency components become at maximum. In accordance with the received focus control signal, the optical system controller 34 drives the front lens group 32A of the optical system 32 so as to attain an in-focus condition. Further, during the convergence measurement, the controller 43 moves the front lens group 32A of the optical system 32 from its in-focus position to set a specified out-of-focus condition.

Although the focus control is performed using the picked up image in this embodiment, a distance sensor may be provided in the image pickup device 3 and the focus control may be performed by controllably driving the optical system 32 based on a distance data between the image pickup device 3 and the color CRT 11 which was obtained by the distance sensor.

The data input device 44 is adapted to input a variety of data used for the convergence measurement. For example, a pitch Pcrt of the phosphor dots of the color CRT 11, a pitch Pccd of the pixels of the CCD 31, data concerning positions of the measurement points, and other data are input by means of the data input device 44.

Next, a measurement of the misconvergence amount is described with respect to a case where a crosshatch pattern is used as the measurement pattern.

Figure 13:
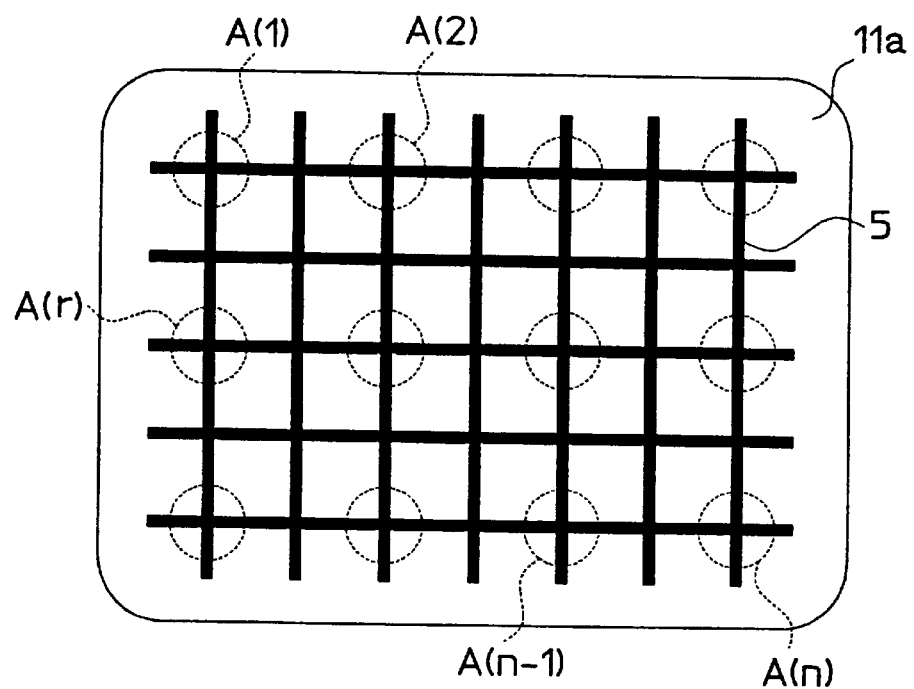
FIG. 13 is a diagram showing a crosshatch pattern displayed on the color CRT.

FIG. 13 is a diagram showing, a crosshatch pattern 5 displayed on the color CRT 11.

The crosshatch pattern 5 is formed by crossing a plurality of vertical lines and a plurality of horizontal lines, and is displayed in a suitable size within a display surface 11a of the color CRT 11 such that a plurality of intersections are included. Misconvergence measurement areas A(1) to A(n) are set in arbitrary positions within the display surface 11a so as to include at least one intersection.

In each measurement area A(r) (r=1, 2, . . . , n), a horizontal direction (X-direction in a X, Y coordinate system) misconvergence amount $\Delta Dx$ is calculated based on the picked up image of the vertical line included in the measurement area A(r), and a vertical direction (Y-direction in a X, Y coordinate system) misconvergence amount $\Delta Dy$ is calculated based on the picked up image of the horizontal line included in the measurement area A(r).

Figure 14:
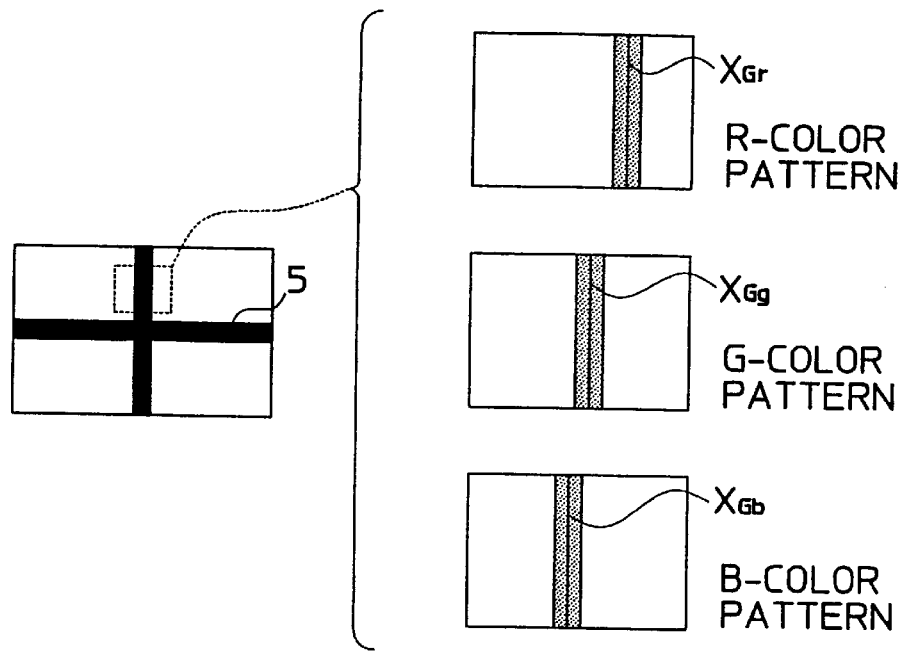
FIG. 14 is diagram showing a vertical line within a measurement area separated into color component lines of R, G, and B.
Figure 15:
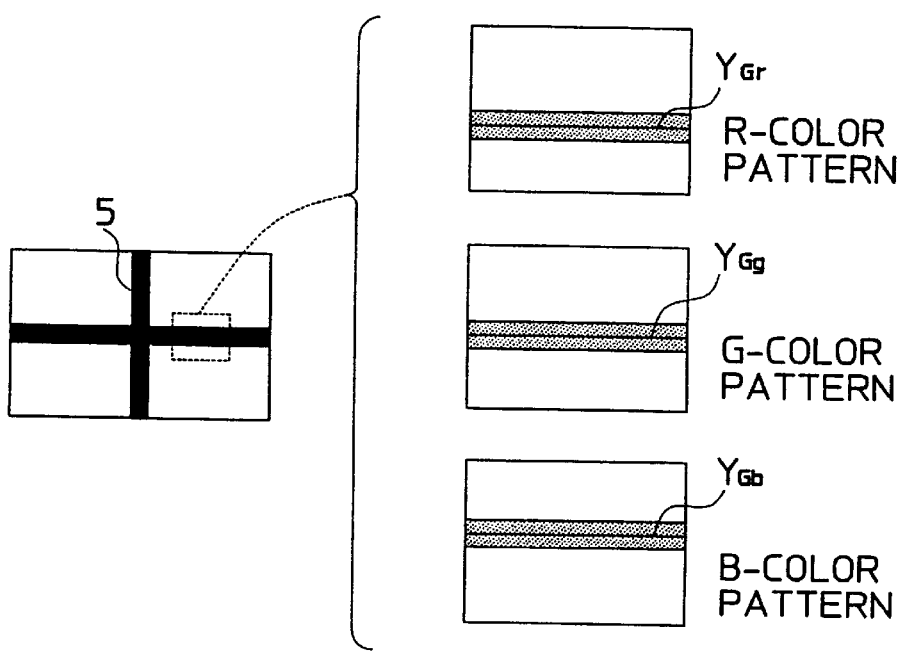
FIG. 15 is diagram showing a horizontal line within a measurement area separated into color component lines of R, G, and B.

FIG. 14 is a diagram showing, a vertical line within the measurement area A(r) separated into color component lines of R, G, and B, and FIG. 15 is a diagram showing a horizontal line within the measurement area A(r) separated into color component lines of R, G, and B.

If $X_{GR}$, $X_{GG}$, and $X_{GB}$ denote glow centers of respective color component vertical lines on the display surface 11a of the color CRT 11 in the X-direction, respectively, the horizontal direction misconvergence amount ΔDx can be expressed by displacements between the glow centers on the basis of any one of the glow centers $X_{GR}$, $X_{GG}$ and $X_{GB}$, e.g. the glow center $X_{GR}$ of the component of R: $\Delta D_{GRX}(=X_{GG}-X_{GR})$, $\Delta D_{BRX}(=X_{GB}-X_{GR})$.

If $Y_{GR}$, $Y_{GG}$, and $Y_{GB}$ denote glow centers of respective color component horizontal lines on the display surface 11a of the color CRT 11 in the Y-direction, respectively, the vertical direction misconvergence amount ΔDy can be expressed by displacements between the glow centers on the basis of any one of the glow centers $Y_{GR}$, $Y_{GG}$ and $Y_{GB}$, e.g. the glow center $Y_{GR}$ of the component of R: $\Delta D_{GRY}(=Y_{GG}-Y_{GR})$, $\Delta D_{BRY}(=Y_{GB}-Y_{GR})$.

The misconvergence amount $\Delta Dx(\Delta D_{GRX}, \Delta D_{BRX})$ is calculated in the following manner. Specifically, the image data of the vertical line within the measurement area A(r) (image data separated into the respective color components) are extracted from the image of the crosshatch pattern 5 picked up by the image pickup device 3. The X-direction glow centers $X_{Gr}$, $X_{Gg}$, $X_{Gb}$ of the color component vertical lines of R, G and B are calculated based on these image data, and the displacements $\Delta D_{grx}(=X_{Gg}-X_{Gr})$ $\Delta D_{brx}(=X_{Gb}-X_{Gr})$ between the respective glow centers are calculated. Since the displacements $\Delta D_{grx}$, $\Delta D_{brx}$ are the misconvergence amount in the image of the crosshatch pattern 5 projected onto the sensing, surface of the CCD 31, the misconvergence ΔDx ($\Delta D_{GRX}$, $\Delta D_{BRX}$) is calculated based on the displacements $\Delta D_{grx}$, $\Delta D_{brx}$ and the magnification β0 of the optical system 32 in accordance with Equations (40), (41).

[Equations (40), (41)]

$$\Delta D_{GRX} = \Delta D_{grx}/\beta_0 = (X_{Gg} - X_{Gr})/\beta_0 \qquad (40)$$

$$\Delta B_{GRX} = \Delta D_{brx}/\beta_0 = (X_{Gb} - X_{Gr})/\beta_0 \qquad (41)$$

The misconvergence amount $\Delta D_y(\Delta D_{GRY}, \Delta D_{BRY})$ is calculated based on the displacements $\Delta D_{gry}$, $\Delta D_{bry}$ in the image of the crosshatch pattern 5 projected onto the sensing surface of the CCD 31 which were calculated in the similar manner and the magnification β0 of the optical system 32 in accordance with Equations (42), (43).

[Equations (42), (43)]

$$\Delta D_{GRY} = \Delta D_{gry}/\beta_0 = (Y_{Gg} - Y_{Gr})/\beta_0 \qquad (42)$$

$$\Delta D_{BRY} = \Delta D_{bry}/\beta_0 = (Y_{Gb} - Y_{Gr})/\beta_0 \qquad (43)$$

The horizontal direction glow centers $X_{Gr}$, $X_{Gg}$, $X_{Gb}$ of the respective color components of the picked up image are calculated in the following manner.

Specifically, the image pickup device 3 is directed to the display surface 11a of the color CRT 11 displaying the crosshatch pattern 5 at a specified distance such that the entire image of the crosshatch pattern 5 falls within the sensing surface. Then, the front lens group 32A of the optical system 32 is controllably driven to temporarily attain an in-focus condition for the crosshatch pattern 5 displayed on the color CRT 11 as shown in FIG. 3. The front lens group 32A of the optical system 32 is then moved from the above position to thereby set a specified out-of-focus condition as shown in FIG. 4. The image of the crosshatch pattern 5 is picked up in this condition. The reason why the image of the crosshatch pattern 5 is picked up in the out-of-focus condition is to establish a predetermined relationship for the maximum spatial frequency $\omega_{MAX}$ of the image projected onto the sensing surface of the CCD 31: $\omega_{MAX} < 2\pi/Pccd$.

The image signal representing the image of the crosshatch pattern 5 picked up by the CCD 31 is output to the device main body 4 after being separated into the respective color component image signals of R, G and B, and is stored in the image memory 42 after being A/D converted by the A/D converter 41.

Subsequently, the color component image data of R, G and B within the measurement areas A(n) are extracted from the image data stored in the image memory 42, and accurate luminances of the respective color components of R, G and B in the respective pixel positions of the CCD 31 are calculated by applying specified calculations to the color component image data. This processing is performed because the pixel data of the respective colors do not represent the accurate luminances of the phosphor dots of the respective colors in the pixel positions due to the fact that the image is picked up in the out-of-focus condition.

Figure 16:
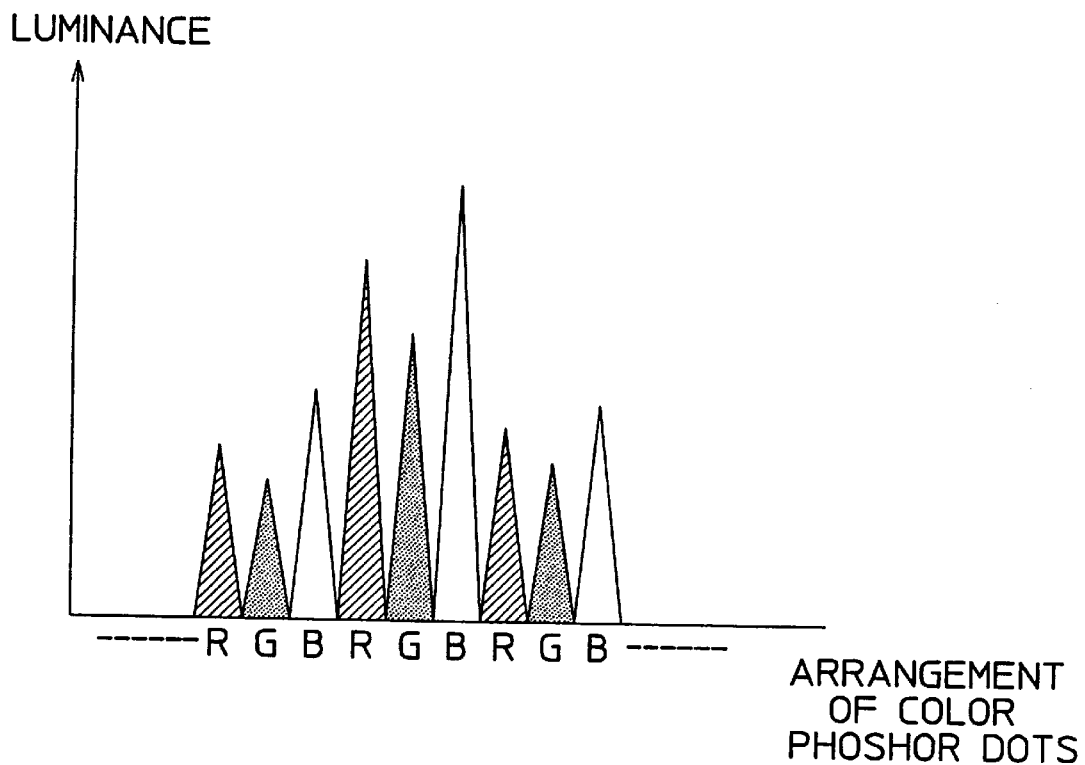
FIG. 16 is a graph showing a luminance distribution of the crosshatch pattern on a display surface of the color CRT.
Figure 17:
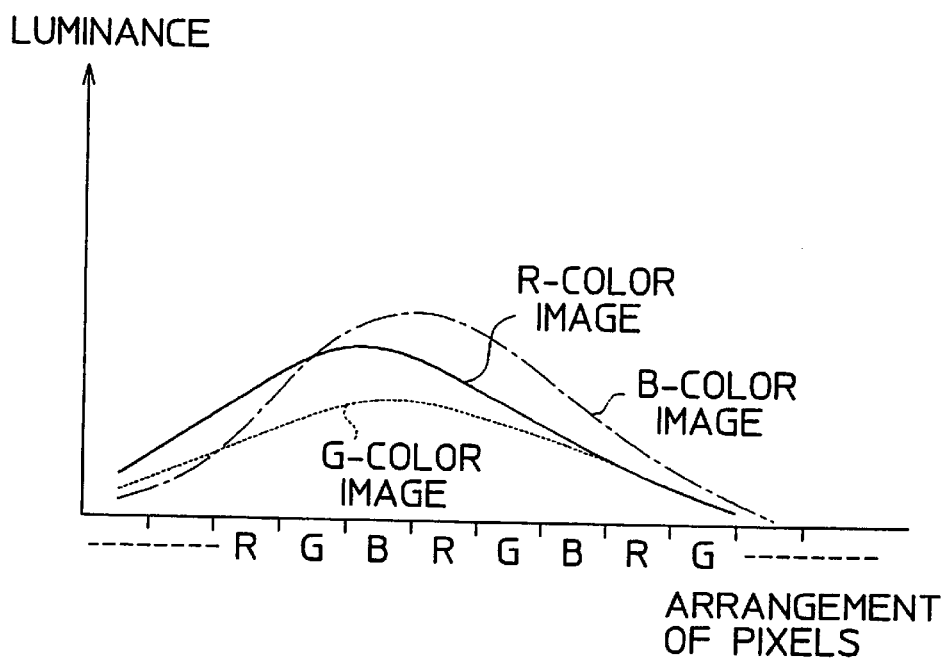
FIG. 17 is a (graph showing luminance distributions of the crosshatch pattern on the sensing surface of the CCD in the out-of-focus condition.

More specifically, if the luminance of the crosshatch pattern 5 on the display surface of the color CRT 11 is distributed, e.g., as shown in FIG. 16, the luminance distribution of the crosshatch pattern 5 in the out-of-focus condition on the sensing surface of the CCD 31 is such as shown in FIG. 17. For example, not only the light emitted from the red phosphor dot, but also the light emitted from the green and blue phosphor dots are incident upon the red pixel. Since the red pixel data includes the light from the green and blue phosphor dots, this data cannot serve as a luminance of the red phosphor dot in this pixel position. Accordingly, in the correction operation, the relative luminances $D_R$, $D_G$ and $D_B$ of the red, green and blue phosphor dots in the respective pixel positions are calculated based on the red, green and blue pixel data Dr, Dg and Db in those pixel positions.

Let it be assumed that the pixels of the CCD 31 are two-dimensionally arranged in a matrix of n×m, $d_R(i, j)$, $d_G(i, j)$ and $d_B(i, j)$ denote the red, green and blue pixel data in each pixel position, and $D_R(i, j)$, $D_G(i, j)$ and $D_B(i, j)$ denote the relative luminances of the red, green and blue phosphor dots in the pixel position (i, j). Then, the pixel data $d_R(i, j)$, $d_G(i, j)$ and $d_B(i, j)$ are expressed by Equation (44).

[Equation (44)]

$$\begin{bmatrix} d_R(i,j) \\ d_G(i,j) \\ d_B(i,j) \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} D_R(i,j) \\ D_G(i,j) \\ D_B(i,j) \end{bmatrix} \qquad (44)$$

A coefficient matrix A of the Equation (44) is the one in the pixel position (i, j). If the coefficient matrix A is expressed by [A(i, j)], the matrix of the pixel data $d_R(i, j)$, $d_G(i, j)$ and $d_B(i, j)$ by $[d_{RGB}(i, j)]$, and the matrix of the luminances $D_R(i, j)$, $D_G(i, j)$ and $D_B(i, j)$ by $[D_{RGB}(i, j)]$, the Equation (44) can be rewritten into $[d_{RGB}(i, j)] = [A(i, j)] [D_{RGB}(i, j)]$.

The coefficient matrix [A(h, k)] is a coefficient relating to the out-of-focus condition, and is calculated based on the pixel data in the pixel position (i, j) when the red, green and blue phosphor dots are individually caused to emit light. In this embodiment, the coefficient matrix [A(h, k)] is measured in advance for each pixel position, and an inverse matrix $[A(h, k)]^{-1}$ calculated from the measurement result is stored in the internal memory 431 of the controller 43. The luminance data of the respective colors $[D_{RGB}(i, j)](=[A(h, k)]^{-1}[d_{RGB}(i, j)]$ is calculated by multiplying the pixel data $[d_{RGB}(i, j)]$ by the inverse matrix $[A(h, k)]^{-1}$.

Subsequently, the glow centers $X_{Gr}$, $X_{Gg}$, $X_{Gb}$ of the red, green and blue components are calculated based on the thus calculated luminance data of the respective colors in accordance with Equation (45) corresponding to the Equation (11).

[Equation (45)]

$$X_{Gr} = \frac{\sum_{i=1}^{i=n}\sum_{j=1}^{j=m} jP_{CCD} \cdot D_R(i,j)}{\sum_{i=1}^{i=n}\sum_{j=1}^{j=m} D_R(i,j)} \quad (45)$$

$$X_{Gg} = \frac{\sum_{i=1}^{i=n}\sum_{j=1}^{j=m} jP_{CCD} \cdot D_G(i,j)}{\sum_{i=1}^{i=n}\sum_{j=1}^{j=m} D_G(i,j)}$$

$$X_{Gb} = \frac{\sum_{i=1}^{i=n}\sum_{j=1}^{j=m} jP_{CCD} \cdot D_B(i,j)}{\sum_{i=1}^{i=n}\sum_{j=1}^{j=m} D_B(i,j)}$$

If it is assumed that $[\Sigma\Sigma D_{RGB}(i,j)]$ is a matrix consisting of elements $\Sigma\Sigma D_R(i,j)$, $\Sigma\Sigma D_G(i,j)$ and $\Sigma\Sigma D_B(i,j)$ as shown in Equation (46) and that $[\Sigma\Sigma d_{RGB}(i,j)]$ is a matrix consisting of elements $\Sigma\Sigma d_R(i,j)$, $\Sigma\Sigma d_G(i,j)$ and $\Sigma\Sigma d_B(i,j)$ as shown in Equation (47), $[\Sigma\Sigma D_{RGB}(i,j)]$ can be calculated in accordance with Equation (48).

[Equations (46) to (48)]

$$\left[\sum_{i=1}^{i=n}\sum_{j=1}^{j=m} D_{RGB}(i,j)\right] = \begin{bmatrix} \sum_{i=1}^{i=n}\sum_{j=1}^{j=m} D_R(i,j) \\ \sum_{i=1}^{i=n}\sum_{j=1}^{j=m} D_G(i,j) \\ \sum_{i=1}^{i=n}\sum_{j=1}^{j=m} D_B(i,j) \end{bmatrix} \quad (46)$$

$$\left[\sum_{i=1}^{i=n}\sum_{j=1}^{j=m} d_{RGB}(i,j)\right] = \begin{bmatrix} \sum_{i=1}^{i=n}\sum_{j=1}^{j=m} d_R(i,j) \\ \sum_{i=1}^{i=n}\sum_{j=1}^{j=m} d_G(i,j) \\ \sum_{i=1}^{i=n}\sum_{j=1}^{j=m} d_B(i,j) \end{bmatrix} \quad (47)$$

$$\left[\sum_{i=1}^{i=n}\sum_{j=1}^{j=m} D_{RGB}(i,j)\right] = [A(h,k)]^{-1}\left[\sum_{i=1}^{i=n}\sum_{j=1}^{j=m} d_{RGB}(i,j)\right] \quad (48)$$

Further, if it is assumed that $[\Sigma\Sigma jP_{ccd} \cdot D_{RGB}(i,j)]$ is a matrix consisting of elements $\Sigma\Sigma jP_{ccd}\cdot D_R(i,j)$, $\Sigma\Sigma jP_{ccd}\cdot D_G(i,j)$ and $\Sigma\Sigma jP_{ccd}\cdot D_B(i,j)$ as shown in Equation (49) and that $[\Sigma\Sigma jP_{ccd}\cdot d_{RGB}(i,j)]$ is a matrix consisting of elements $\Sigma\Sigma jP_{ccd}\cdot d_R(i,j)$, $\Sigma\Sigma jP_{ccd}\cdot d_G(i,j)$ and $\Sigma\Sigma jP_{ccd}\cdot d_B(i,j)$ as shown in Equation (50), $[\Sigma\Sigma jP_{ccd}\cdot D_{RGB}(i,j)]$ can be calculated in accordance with Equation (51).

[Equations (49) to (51)]

$$\left[\sum_{i=1}^{i=n}\sum_{j=1}^{j=m} jP_{CCD}\cdot D_{RGB}(i,j)\right] = \begin{bmatrix} \sum_{i=1}^{i=n}\sum_{j=1}^{j=m} jP_{CCD}\cdot D_R(i,j) \\ \sum_{i=1}^{i=n}\sum_{j=1}^{j=m} jP_{CCD}\cdot D_G(i,j) \\ \sum_{i=1}^{i=n}\sum_{j=1}^{j=m} jP_{CCD}\cdot D_B(i,j) \end{bmatrix} \quad (49)$$

$$\left[\sum_{i=1}^{i=n}\sum_{j=1}^{j=m} jP_{CCD}\cdot d_{RGB}(i,j)\right] = \begin{bmatrix} \sum_{i=1}^{i=n}\sum_{j=1}^{j=m} jP_{CCD}\cdot d_R(i,j) \\ \sum_{i=1}^{i=n}\sum_{j=1}^{j=m} jP_{CCD}\cdot d_G(i,j) \\ \sum_{i=1}^{i=n}\sum_{j=1}^{j=m} jP_{CCD}\cdot d_B(i,j) \end{bmatrix} \quad (50)$$

$$\left[\sum_{i=1}^{i=n}\sum_{j=1}^{j=m} jP_{CCD}\cdot D_{RGB}(i,j)\right] = [A(h,k)]^{-1}\left[\sum_{i=1}^{i=n}\sum_{j=1}^{j=m} d_{RGB}(i,j)\right] \quad (51)$$

The horizontal direction misconvergence amount $\Delta Dx$ ($\Delta D_{GRX}$, $\Delta D_{BRX}$) is calculated by substituting the glow centers $X_{Gr}$, $X_{Gg}$, $X_{Gb}$ of the respective color components of R, G and B calculated in accordance with the Equation (45) into the Equations (40) and (41).

The vertical direction glow centers $Y_{Gr}$, $Y_{Gg}$, $Y_{Gb}$ of the respective color components of R, G and B in the picked up image are calculated in the similar manner as above. The vertical direction misconvergence amount $\Delta D_y$ ($\Delta D_{GRY}$, $\Delta D_{BRY}$) is calculated by substituting the glow centers $Y_{Gr}$, $Y_{Gg}$, $Y_{Gb}$ into the Equations (42) and (43).

As described above, the image of the entire crosshatch pattern 5 displayed on the color CRT 11 is picked up in the specified out-of-focus condition, and the glow centers $x_G$ in arbitrary measurement points are calculated based on the image data representing the picked up image. Accordingly, the glow centers $x_G$ can be easily and rapidly calculated in a plurality of measurement points by a simple construction.

Particularly, since the optical system 32 is constructed such that the principle rays having passed through the optical system 32 propagate substantially in parallel with the optic axis, the Equation (8) used to calculate the glow center $x_G$ based on the image data can be simplified. As a result, the glow centers can be rapidly and highly accurately calculated.

Further, since the CCD 31 is constituted by a single plate color image sensor, the respective color component image data of R, G and B can be simultaneously obtained, with the result that the glow centers $x_G$ of the phosphor dots of the respective colors can be simultaneously measured.

Although the glow center measuring device according to the invention is described with respect to the convergence measuring device for the color CRT in the foregoing embodiment, it can be applied to a glow center measurement for a color display device such as a projection type color display, a color LCD (Liquid Crystal Display), or a color plasma display and/or a monochromatic display device.

Although the foregoing embodiment is described with respect to the case where the image pickup device includes the single plate CCD provided with primary color filters, the image pickup device is not limited to this type. The image pickup device may include a double-plate or triple-plate image sensor (may be an image tube). Further, the color filters may be either of primary colors or of complementary colors.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A measuring device for measuring a glow center of a display device, the measuring device comprising:

an image pickup device which includes a sensing surface defined by a plurality of photoelectric conversion elements arranged in a two-dimensional manner at a specified pitch and picks up a light image to produce image data;

an optical system which transmits a light image displayed on a display device to the sensing surface of the image pickup device;

an optical system controller which controls the optical system to transmit the light image to the sensing surface in such a manner that the maximum spatial frequency of the light image at the sensing surface of the image pickup device is smaller than the reciprocal of the pitch of the photoelectric conversion element arrangement; and a calculator which calculates a glow center of the light image on the display device based on image data produced by the image pickup device.

2. A measuring device as defined in claim 1, wherein the optical system has an optic axis substantially in parallel with principle rays of the light image.

3. A measuring device as defined in claim 2, wherein:

the image pickup device is provided with a plurality of filter portions having spectral sensitivities different from one another to produce image data for a plurality of color components of the light image; and the calculator includes:

a luminance calculating portion which calculates relative luminances of the plurality of color components by multiplying the output data of the color components by specified matrix coefficients; and a glow center calculating portion which calculates glow centers of the plurality of color components based on their respective relative luminances calculated by the luminance calculating portion.

4. A measuring device as defined in claim 1, further comprising:

a storage device which stores a point-spread function h(x) of the optical system; and a correction device which corrects a glow center calculated by the calculator based on the point-spread function h(x) stored in the storage device.

5. A measuring device as defined in claim 4, wherein:

the image pickup device is provided with a plurality of filter portions having spectral sensitivities different from one another to produce image data for a plurality of color components of the light image; and the calculator includes:

a luminance calculating portion which calculates relative luminances of the plurality of color components by multiplying the output data of the color components by specified matrix coefficients; and a glow center calculating portion which calculates glow centers of the plurality of color components based on their respective relative luminances calculated by the luminance calculating portion.

6. A measuring device as defined in claim 4, wherein the correction device calculates a Fourier transform H($\omega$) of the point-spread function h(x) of the optical system and then a derivative H'(0)/H(0) of the Fourier transform, and corrects a glow center calculated by the calculator using the derivative H'(0)/H(0).

7. A measuring device as defined in claim 1, wherein:

the image pickup device is provided with a plurality of filter portions having spectral sensitivities different from one another to produce image data for a plurality of color components of the light image; and the calculator includes:

a luminance calculating portion which calculates relative luminances of the plurality of color components by multiplying the output data of the color components by specified matrix coefficients; and a glow center calculating portion which calculates glow centers of the plurality of color components based on their respective relative luminances calculated by the luminance calculating portion.

8. A measuring device as defined in claim 1, wherein the optical system controller controls the optical system to first come into an in-focus condition and then come into an out-of-focus condition corresponding to the maximum spatial frequency of the light image at the sensing surface of the image pickup device.

9. A measuring device as defined in claim 1, wherein the point-spread function h(x) of the optical system is substantially an even function.

10. A measuring device as defined in claim 1, wherein the derivative of the point-spread function h(x) of the optical system is continuous.

11. A measuring device as defined in claim 10, wherein the point-spread function h(x) of the optical system has a normal continuous distribution.

12. A measuring device as defined in claim 10, wherein the point-spread function h(x) of the optical system has a distribution in the form of (sinX/X)".

13. A measuring device as defined in claim 10, wherein the optical system is provided with a filter having a transmittance characteristic of a normal distribution.

14. A measuring device as defined in claim 10, wherein the optical system has an optic axis substantially in parallel with principle rays of the light image.

15. A measuring device as defined in claim 14, wherein:

the image pickup device is provided with a plurality of filter portions having spectral sensitivities different from one another to produce image data for a plurality of color components of the light image; and the calculator includes:

a luminance calculating portion which calculates relative luminances of the plurality of color components by multiplying the output data of the color components by specified matrix coefficients; and a glow center calculating portion which calculates glow centers of the plurality of color components based on their respective relative luminances calculated by the luminance calculating portion.

16. A measuring device as defined in claim 10, further comprising:

a storage device which stores a point-spread function h(x) of the optical system; and a correction device which corrects a glow center calculated by the calculator based on the point-spread function h(x) stored in the storage device.

17. A measuring device as defined in claim 16, wherein:

the image pickup device is provided with a plurality of filter portions having spectral sensitivities different from one another to produce image data for a plurality of color components of the light image; and the calculator includes:

a luminance calculating portion which calculates relative luminances of the plurality of color components by multiplying the output data of the color components by specified matrix coefficients; and a glow center calculating portion which calculates glow centers of the plurality of color components based on their respective relative luminances calculated by the luminance calculating portion.

18. A measuring device as defined in claim 16, wherein the correction device calculates a Fourier transform H(ω) of the point-spread function h(x) of the optical system and then a derivative H'(0)/H(0) of the Fourier transform, and corrects a glow center calculated by the calculator using the derivative H'(0)/H(0).

19. A measuring device as defined in claim 10, wherein:
the image pickup device is provided with a plurality of filter portions having spectral sensitivities different from one another to produce image data for a plurality of color components of the light image; and
the calculator includes:
a luminance calculating portion which calculates relative luminances of the plurality of color components by multiplying the output data of the color components by specified matrix coefficients; and
a glow center calculating portion which calculates glow centers of the plurality of color components based on their respective relative luminances calculated by the luminance calculating portion.

20. A measuring device as defined in claim 10, wherein the optical system controller controls the optical system to first come into an in-focus condition and then come into an out-of-focus condition corresponding to the maximum spatial frequency of the light image at the sensing surface of the image pickup device.

21. A measuring device as defined in claim 10, wherein the point-spread function h(x) of the optical system is substantially an even function.

22. A measuring device for measuring a glow center of a display device, the measuring device comprising:
an image pickup device which includes a sensing surface defined by a plurality of photoelectric conversion elements arranged in a two-dimensional manner at a specified pitch and picks up a light image to produce image data;
an optical system which transmits a light image displayed on a display device to the sensing surface of the image pickup device;
an optical system controller which controls the optical system to transmit the light image to the sensing surface in such a manner that the maximum spatial frequency of the light image at the sensing surface of the image pickup device is smaller than the reciprocal of the pitch of the photoelectric conversion element arrangement;
a calculator which calculates a glow center of the light image on the display device based on the image data produced by the image pickup device;
a storage device which stores a point-spread function h(x) of the optical system; and
a correction device which corrects a glow center calculated by the calculator based on the point-spread function h(x) stored in the storage device, wherein the correction calculates $X_G = \int x \cdot h(x) dx / \int h(x) dx$ with respect to a specified area of the point-spread function h(x) of the optical system, and corrects a glow center calculated by the calculator using the calculated $X_G$.

23. A measuring device for measuring a glow center of a display device, the measuring device comprising:
an image pickup device which includes a sensing surface defined by a plurality of photoelectric conversion elements arranged in a two-dimensional manner at a specified pitch and picks up a light image to produce image data;
an optical system which transmits a light image displayed on a display device to the sensing surface of the image pickup device;
an optical system controller which controls the optical system to transmit the light image to the sensing surface in such a manner that the maximum spatial frequency of the light image at the sensing surface of the image pickup device is less than the quantity 2π divided by the pitch of the photoelectric conversion element arrangement; and
a calculator which calculates a glow center of the light image on the display device based on the image data produced by the image pickup device.

24. A measuring device for measuring a glow center of a display device, the measuring device comprising:
an image pickup device which includes a sensing surface defined by a plurality of photoelectric conversion elements arranged in a two-dimensional manner at a specified pitch and picks up a light image to produce image data;
an optical system which transmits a light image displayed on a display device to the sensing surface of the image pickup device, wherein said optical system has a point-spread function h(x) whose derivative is continuous;
an optical system controller which controls the optical system to transmit the light image to the sensing surface in such a manner that the maximum spatial frequency of the light image at the sensing surface of the image pickup device is smaller than the reciprocal of the pitch of the photoelectric conversion element arrangement;
a calculator which calculates a glow center of the light image on the display device based on the image data produced by the image pickup device;
a storage device which stores the point-spread function h(x) of the optical system; and
a correction device which corrects a glow center calculated by the calculator based on the point-spread function h(x) stored in the storage device, wherein the correction calculates $X_G = \int x \cdot h(x) dx / \int h(x) dx$ with respect to a specified area of the point-spread function h(x) of the optical system, and corrects a glow center calculated by the calculator using the calculated $X_G$.

25. A measuring device for measuring a glow center of a display device, the measuring device comprising:
an image pickup device which includes a sensing surface defined by a plurality of photoelectric conversion elements arranged in a two-dimensional manner at a specified pitch and picks up a light image to produce image data;
an optical system which transmits a light image displayed on a display device to the sensing surface of the image pickup device, wherein said optical system has a point-spread function h(x) whose derivative is continuous;
an optical system controller which controls the optical system to transmit the light image to the sensing surface in such a manner that the maximum spatial frequency of the light image at the sensing surface of the image pickup device is less than the quantity 2π divided by the pitch of the photoelectric conversion element arrangement; and
a calculator which calculates a glow center of the light image on the display device based on the image data produced by the image pickup device.

* * * * *